United States Patent [19]

Kruder et al.

[11] 4,074,362
[45] Feb. 14, 1978

[54] VENTED INJECTION MOLDING MACHINE

[75] Inventors: George A. Kruder, Marion; Clyde S. Gudermuth, Jr., Mount Gilead, both of Ohio

[73] Assignee: HPM Corporation, Mount Gilead, Ohio

[21] Appl. No.: 743,489

[22] Filed: Nov. 19, 1976

[51] Int. Cl.² .............................................. B29B 1/06
[52] U.S. Cl. ........................................ 366/82; 366/87; 366/289; 366/323; 425/208
[58] Field of Search .................. 259/191, 192, 193, 97, 259/9, 10, 25, 26, 45, 46; 425/207, 208, DIG. 812

[56] References Cited

U.S. PATENT DOCUMENTS

| | | | |
|---|---|---|---|
| 3,177,272 | 4/1965 | Plymale | 425/207 |
| 3,263,276 | 8/1966 | Maier | 425/208 |
| 3,737,151 | 6/1973 | Schaeffer | 259/191 |
| 3,888,393 | 6/1975 | Drori | 425/207 |

*Primary Examiner*—Robert W. Jenkins
*Attorney, Agent, or Firm*—Burns, Doane, Swecker & Mathis

[57] ABSTRACT

A vented injection molding machine adapted to handle a wide variety of synthetic resinous materials without predrying is disclosed. The molding machine includes a two-stage screw rotatably and reciprocably mounted within a barrel. The barrel includes a pair of ends, a feed opening at one end and a vent opening intermediate the pair of ends. A first stage of the screw essentially completes material plastication. The first stage has a protruding helical screw flight with a first pitch and includes a feed section communicating with the feed opening, a transition section, and a pumping section. A second stage of the screw includes a deep flighted vent section which communicates with the vent opening and the first stage pumping section, a short transition section and a relatively short second pumping section. The second stage also includes a protruding helical screw flight having a second pitch which is greater than the first pitch of the first stage. In addition, a radially protruding slotted blister ring may be provided on the screw to separate the first and second stages while allowing fluid communication therebetween. An operating assembly is connected to the screw to rotate and advance the screw and may cause retraction of the screw from the barrel during the accumulation of a quantity of plasticated material.

9 Claims, 4 Drawing Figures

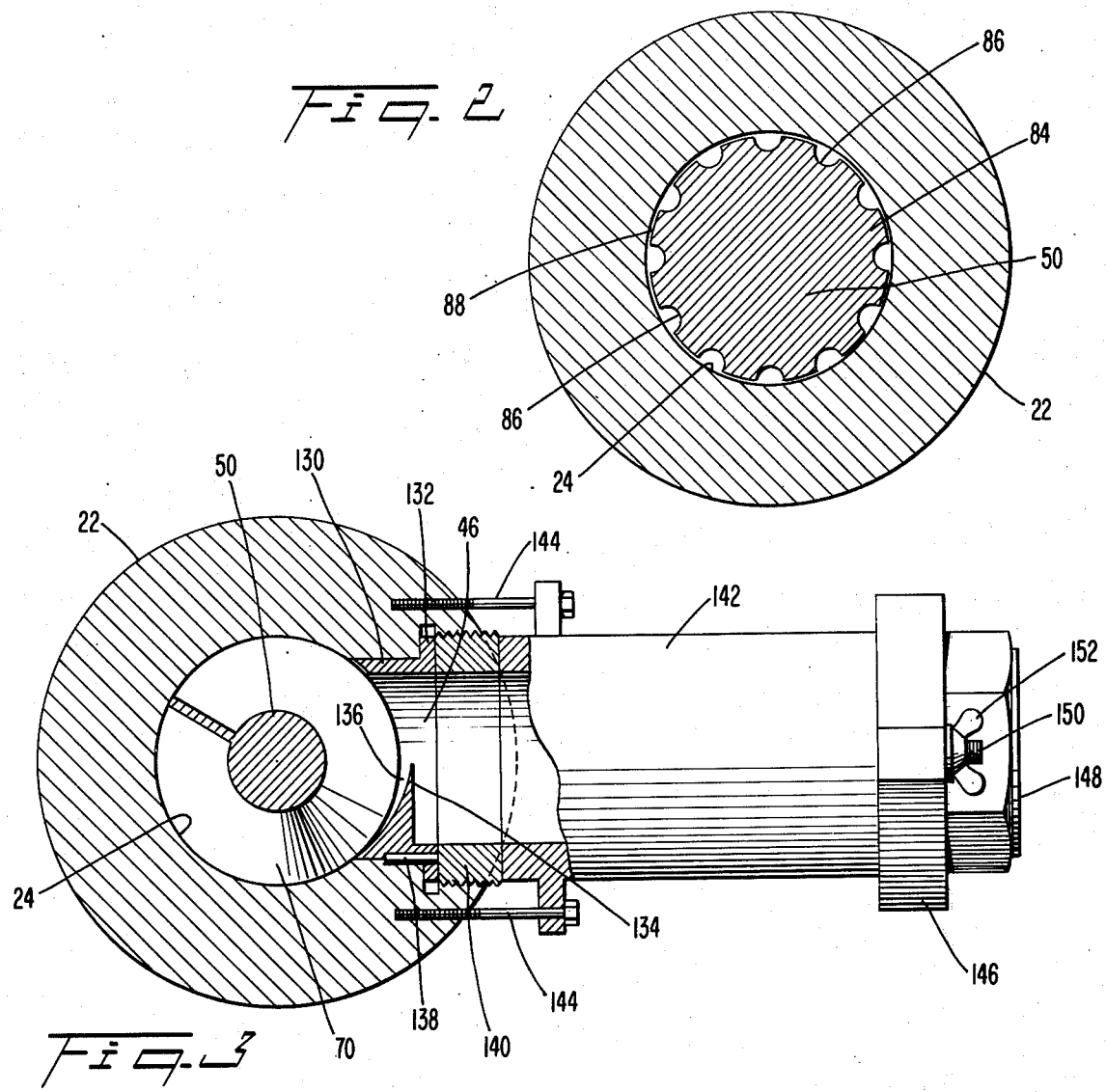
Fig. 2
Fig. 3
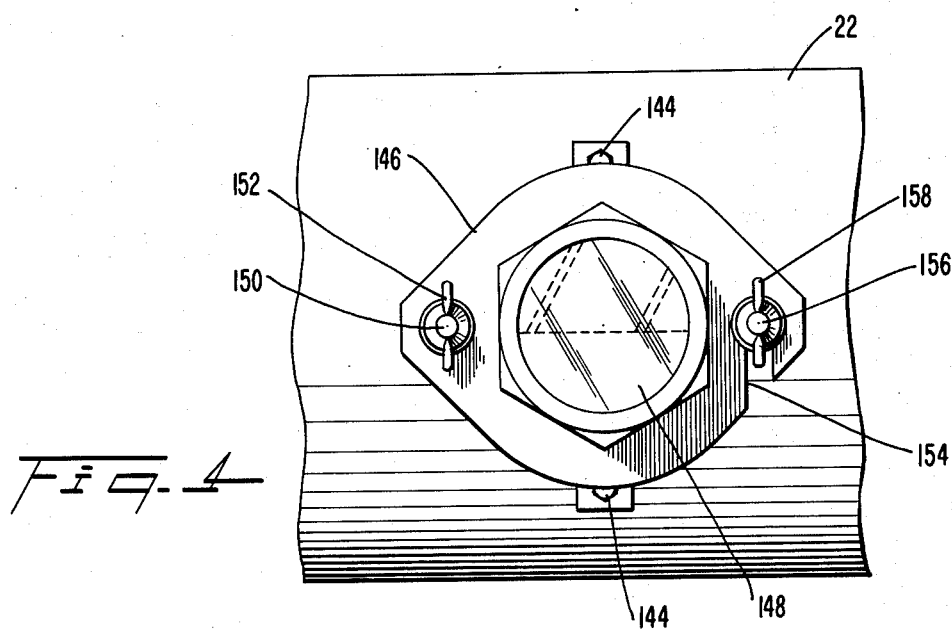
Fig. 4

VENTED INJECTION MOLDING MACHINE

BACKGROUND OF THE INVENTION

This invention relates generally to injection molding machines. More particularly, this invention concerns vented injection molding machines having a two-stage screw therein.

An injection molding machine typically receives synthetic resinous material as a particulate feedstock, heats, masticates and plasticates the material to a moldable consistency and forces the plasticated material into a mold. In the past, the presence of readily volatilized substances or moisture in a particulate synthetic resinous material feedstock for an injection molding machine frequently led to defects in a molded product fashioned by the molding machine. Many defects are attributed to the evolution of gaseous pockets containing water vapor or volatilized substances. For example, defects such as polymer degradation and diminished physical material properties in a molded product have been associated with gaseous pockets. Moreover, surface defects, such as loss of gloss and voids, sometimes occur in the molded product as a result of gaseous pockets. These latter defects are sometimes merely cosmetic but do, on occasion, substantially affect physical properties of the molded product. As a result of the increased potential for defective products, moisture and volatilizable substances must be eliminated from synthetic resinous material during molding thereof.

One solution for avoiding moisture in feedstock requires a separate drying apparatus to predry hygroscopic synthetic resinous material and to remove the moisture therefrom before being supplied to an injection molding machine. Provision of separate drying apparatus includes an additional capital expense which detracts from profitability of the injection molding apparatus.

To accommodate a feedstock having readily volatilized substances therein, an injection molding machine should be provided with a vent to allow gaseous volatiles to escape after the feedstock has been plasticated and masticated to a molding consistency. The known prior art vented molding machines, however, are subject to bleed of plasticized material from the vent opening with an associated problem of possible blockage of the vent opening.

When dealing with feedstock having fine particle size, such as a powdered feedstock, a vent opening is also necessary in a molding machine to eliminate air occlusions which may occur from air pockets fed along with the feed material into the plasticating screw of the molding machine.

Examples of particular synthetic resinous materials for which venting is desirable during injection molding are as follows: polyesters, polycarbonates, nylons, acrylics, ABS, styrenic polymers, acetal polymers, polyphenylene oxides, and barrier resins (such as "Barex", and "Lopac").

In fashioning articles of indeterminate length from synthetic resinous materials, vented extruders allow removal of volatiles as well as moisture from feedstock. Extruders, however, operate with essentially steady material flow into the machine, essentially steady or continuous flow of product material out of the machine, and essentially steady flow of material through a vent section of the extruder machine. As a result of the essentially steady operation of the vented extruders, only small perturbations of flow conditions inside the barrel at a vent opening typically occur.

A typical injection molding machine, by comparison, operates in a cycle having a plasticating portion during which feedstock is prepared to a molding consistency, an injection portion during which the plasticated material is injected into a mold cavity, and a holding portion during which material in the mold is permitted to solidify. The cyclical operation of the molding machine causes unsteady flow conditions to prevail inside the molding machine. Such unsteady flow conditions have a contributory effect on the bleed problem described above where a vent opening communicates with a screw receiving bore to exhaust volatile materials.

Moreover, in a vented molding machine a second stage of the screw, downstream of a vent portion, must be relatively long to adequately develop the material pressure necessary to force the screw out of the barrel against a back pressure. This long second stage can lead to the need for an additional support at the usual cantilevered end of the machine barrel as well as other difficulties.

During the injection portion of a molding cycle, a plasticating screw is typically impulsively stroked forward through a distance of several inches to inject a charge of plasticated material into a mold cavity. During this injection portion, pressures in the plasticated material on the order of 20,000 psi have been known to exist and to aggravate the vent bleed problem.

A particularly undesirable result frequently occurs due to bleeding of plasticated material from the vent opening: the plasticated material may solidify in the vent opening and thereby block the vent opening. When this unfavorable result occurs, the subsequent release of volatilized material from the vent opening is severely inhibited, if not actually prevented.

Various injection molding machines have been proposed in the prior art to overcome problems of the type described above. However, each of the prior art machines is objectionable by virtue of having one or more of the following disadvantages: narrow range critical operation; low plasticating capacity; and extensive modifications of a conventional mechanical or hydraulic operating system.

Thus, a need continues to exist for an effective injection molding machine having a vent that permits volatile materials and water vapor to be released from a plasticized material during an injection molding machine cycle.

SUMMARY OF THE INVENTION

An injection molding machine which overcomes the problems discussed above includes a barrel having a longitudinally extending screw-receiving bore. The barrel includes a generally radially extending feed opening at one end for introduction of particulate feed material to the longitudinal bore. A second end of the barrel has a discharge opening to provide fluid communication between the longitudinal bore and a mold. A generally radial vent opening, positioned between the feed opening and the discharge opening, allows water vapor and gaseous volatiles to escape from the longitudinal bore.

A two-stage plasticating screw is rotatably and reciprocably mounted within the longitudinal bore and cooperates with the barrel to plasticate, devolatilize and inject synthetic resinous material into the mold. A first stage of the screw communicates with the feed opening and extends longitudinally of the screw. The first stage receives, masticates, and substantially completes plastication of particulate synthetic resinous material feedstock. The rate at which material leaves the first stage is regulated by a ring at the downstream end of the first stage. Downstream of the first stage is a second stage which communicates with the vent opening and extends to a distal end of the screw. The second stage receives plasticated material from the first stage, devolatilizes the plasticated material and advances the plasticated devolatilized material to the distal end.

The first stage includes a first helical screw flight having a first pitch. The second stage includes a second helical screw flight having a second pitch which exceeds the first pitch of the first stage. With the relatively smaller first pitch, the first stage and the ring cooperate to starve feed synthetic resinous material to the second stage which improves tolerance of the machine to various synthetic resinous materials. Moreover, the larger second pitch causes a greater material capacity so that the second stage moves material past the vent opening more quickly to thereby diminish the potential for material bleed from the vent opening. In addition, the larger material capacity of the second mollifies the tendency of plasticated material to accumulate in the second stage in response to back pressure increases at the distal end of the screw. Accordingly, a sensitivity of material bleed through the vent opening to back pressure variations is substantially diminished.

The downstream portion of the second stage includes a short pumping section in which a helical channel defined by the second helical screw flight is substantially filled by plasticated material being conveyed to the distal end of the screw. The filled channel provides a hydraulic seal for the downstream end of a vent section which communicates with the vent opening. In this manner, the downstream terminus of the vent section is defined. The relatively smaller pitch of the first stage permits the plasticating screw to be rotated at a greater speed so that most plastication of the material occurs in the first stage. Accordingly, only a short pumping section is required at the downstream end of the second stage.

Apparatus for rotating and reciprocating the screw is also provided with the capability of positively retracting the screw from the barrel while material accumulates therein. In this fashion, pressure flow through the short pumping section is diminished and vent bleed is further minimized.

In applications where the vent opening is horizontally oriented with respect to the longitudinal axis of the barrel, a vertically extending baffle may be provided only in the upper portion of the vent opening. In this manner, the baffle may function as a dam to inhibit material from bleeding through the vent opening.

To improve the range of semi-plastic materials for which the plasticating screw may be used, the first and second screw stages may be separated by a blister ring having a plurality of longitudinally aligned circumferentially-spaced slots. The peripherial surface of the blister ring may be machined quickly to the necessary diameter for a particular material to be handled in the injection molding machine. Accordingly, one plasticating screw can be designed that, with a minor modification, can be adapted to handle any one of a wide variety of synthetic resinous materials.

BRIEF DESCRIPTION OF THE DRAWINGS

Many objects of the present invention will be apparent to those skilled in the art when this specification is read in conjunction with the attached drawings wherein like reference numerals have been applied to like elements and wherein:

FIG. 2 is a view in partial cross section taken along the line 2—2 of FIG. 1;

FIG. 3 is a view in partial cross section taken along the line 3—3 of FIG. 1; and FIG. 4 is an end elevation of the horizontal vent tube of FIG. 3.

DETAILED DESCRIPTION OF THE INVENTION

Figure 1:
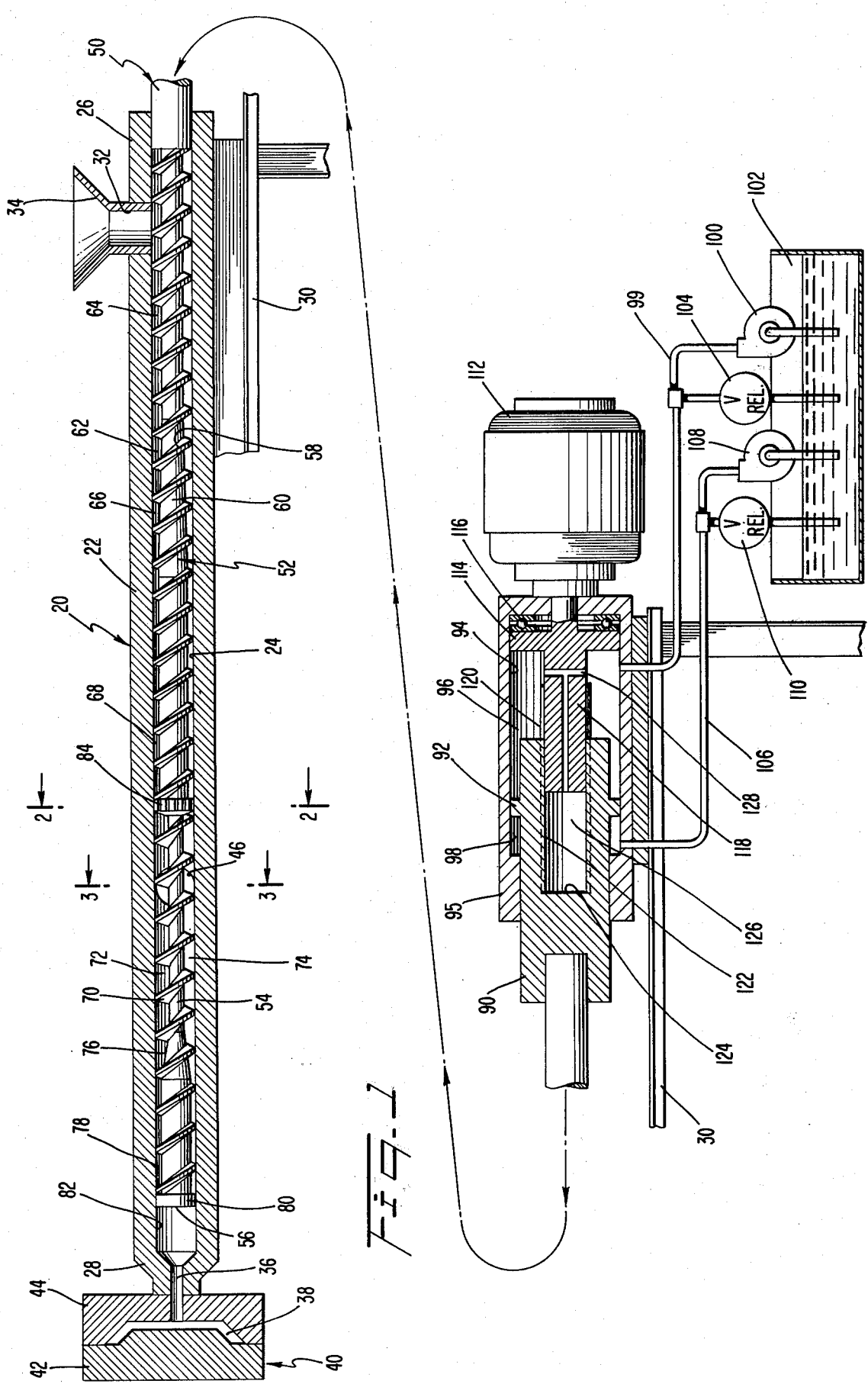
FIG. 1 is a view in partial cross section of a vented injection molding machine.

A vented injection molding machine constructed according to the description herein is suitable for use with any one of a wide variety of synthetic resinous materials. Among the suitable materials for use in the vented injection molding machine, are polyesters, polycarbonates, acrylics, nylons, styrenic polymers, barrier resins, acetal polymers, polyphenylene oxides, and ABS. Typically, the synthetic resinous material fed to the injection molding machine will be in a particulate form. The particle size may be very small such that the material resembles a powder.

Turning now to FIG. 1, a vented injection molding machine 20 includes an elongated barrel 22 provided with a centrally disposed longitudinal bore 24 having a generally circular cross section. The bore 24 extends from a first end 26 of the barrel 22 to a second end 28 of the barrel and is adapted to receive a plasticating screw. The first end 26 of the barrel is supported by a base structure 30 such that the second end 28 extends from the base 30 in a cantilever fashion.

At the first end 26 of the barrel, a generally radial feed opening 32 extends substantially vertically through the barrel 22 to provide communication with the bore 24. Mounted on top of the barrel 22 in general alignment with the feed opening 32 is a feed hopper 34. The hopper 34 holds synthetic resinous material in particulate form, i.e., a feed stock, such that the material may enter the bore 24 through the feed opening 32.

The second or distal end 28 of the barrel 22 includes a discharge opening or channel 36 substantially aligned with the longitudinal bore 24. The discharge opening communicates with a mold cavity 38 and with the bore 24 to allow injection of plasticated material into the mold cavity 38. The mold cavity is defined by a mold assembly 40 having a first mold portion 42 and a second mold portion 44.

Also communicating with the bore 24 of the barrel 22 (see FIG. 3), is a generally radial vent opening 46 which may be substantially horizontal, as illustrated in FIG. 3, or which may be substantially vertical. Of course, an intermediate position may also be selected as desired. The vent opening 46 is positioned between the feed opening 32 and the distal end 28 of the barrel 22 as indicated in FIG. 1. Ordinarily, the vent opening 46 is located less than 50% of the distance from the distal end 28 to the feed opening and closer to the distal end 28.

Positioned within the bore 24 is an elongated plasticating screw 50 having two stages and a length to diameter ratio of about 26. The screw 50 is rotatably and reciprocably mounted in the barrel bore 24. A first stage 52 of the screw 50 communicates with the feed opening 32 and extends to a location between the vent opening 46 and the feed opening 32 such that the downstream end of the first stage 52 remains upstream of the vent opening 46 for all longitudinal positions of the screw 50 relative to the barrel. The first stage 52 in cooperation with the barrel 22 is operable to heat, masticate, and substantially completely plasticate the particulate material feed stock to a substantially moldable consistency. In so doing, any moisture and volatizable material becomes gaseous.

Downstream of the first stage 52 is a second stage 54 which may be axially spaced therefrom. The second stage 54 extends from the downstream end of the first stage 52 to a distal end 56 of the screw and is operable to receive plasticated material from the first stage 52, to allow gaseous material to vent through the vent opening 46 and to convey plasticated material to the screw end 56 for accumulation.

More particularly, the first stage 52 includes a radially outwardly extending helical screw flight 58 which cooperates with the screw root 60 and the bore 24 to define a helical channel 62 of variable depth. Channel depth is measured radially from the screw root 60 to the barrel bore 24. The helical channel 62 extends through the first stage and has a first uniform depth feed portion 64 communicating with the feed opening 32 and operable to receive particulate synthetic resinous material from the feed opening 32 during rotation of the screw 50.

Downstream of the feed section 64, the channel 62 includes a transition section 66 in which the helical channel 62 has a decreasing depth such that the diameter of the screw root 60 increases. In the transition section 64 mastication, heating and pressurization occur. Downstream of the transition section 66, the channel includes a first pumping section 68 having a substantially uniform and shallow depth in comparison to the feed section 64. The pumping section 68 extends to the downstream end of the first stage 52 and is operable to substantially complete plastication of the synthetic resinous material to a substantially moldable consistency as well as to effect vaporization of moisture and volatile substances present in the feed stock. Representative proportions for the first stage 52 are the feed section 64 with a length about seven times the screw diameter, the transition section 66 with a length about four times the screw diameter and the pumping section 68 with a length about five and one-half times the screw diameter.

With continued reference to FIG. 1, the plasticated synthetic resinous material may leave the first helical channel 62 and directly enter the second stage 54 of the screw 50.

The second stage 54 also includes a generally radially extending helical screw flight 70 which cooperates with the shank 60 of the screw 50 and the bore 24 to define a second helical channel 72 through which plasticated material is conveyed as the screw rotates. The screw flight 70 has a helical pitch, the axial distance between corresponding points of adjacent screw flight convolutions, which exceeds the helical pitch of the first screw flight 58.

The second helical channel 72 has a variable depth and extends from the downstream end of the first stage to the distal end 56 of the screw. The upstream end of the second helical channel 72 includes a vent portion 74 in which the channel depth is substantially greater than the depth of the first helical channel 62 in the pumping section 68 and preferably is greater than the depth of the first helical channel 62 in the feed section 64. The vent portion 74 communicates with the vent opening 46 for all longitudinal positions of the screw 50 in the barrel 22 so that vaporized moisture and volatile material can escape. Moreover, the comparatively greater depth of the vent section 74 allows depressurization of the plasticated material to facilitate release of pockets of vaporized material.

Downstream of the vent section 74, the plasticated material will completely fill the second helical channel 72 and create an hydraulic seal for the vent section. A relatively short transition section 76, in which the depth of the second helical channel 72 decreases rapidly, is located downstream of the vent section 74. Downstream of the transition section 74 is a relatively short second pumping stage 78 in which the helical channel 72 has a comparatively small depth, much smaller than the vent section and the feed section; but greater than the first pumping section depth. The vent section 74 may have a length about six times the screw diameter, the transition section 76 a length about one times the screw diameter and the short pumping section 78 a length about three times the screw diameter.

At the distal end of the screw 56, a suitable conventional non-return valve 80 may be provided to inhibit the flow of plasticated material upstream into the second helical channel 72 from a chamber or cavity 82. The distal end 56 of the screw, the valve 80, the bore 24 and the channel 36 cooperate to define the cavity 82 so that plasticated synthetic resinous material may accumulate during a plasticating portion of an injection molding cycle. From FIG. 1, it will be seen that the cavity 82 communicates with the channel 36 which, in turn, communicates with the mold cavity 38.

A ring means may be positioned upstream of the second helical channel 72 and downstream of the first helical channel 62 such that the first and second stages 52, 54 are axially spaced. Moreover, the ring means enables the first stage 52 to be valved independently of the second stage 54. In this manner, the first stage 52 can be provided with an essentially fixed back pressure. The ring means may comprise a radially outwardly extending annular ring (not shown) which is radially spaced from the bore 24 to define a restricted annular space through which plasticated material may flow.

Alternatively, the ring means may include a slotted blister ring 84 provided with a plurality of longitudinally extending channels 86 (see FIG. 2). The slotted blister ring 84 has a circumferential surface 88 and may be an integral protrusion of the screw 50. The circumferential surface 88 of the blister ring 84 is preferably spaced from the bore 24 by a small radial clearance such that the screw 50 can rotate in the bore 24 without interference and so that the bulk of the plasticated material leaving the first helical channel 62 flows axially through the channels 86. While any suitable number of channels 86 may be provided, twelve channels are illustrated in FIG. 2 and are equiangularly spaced around the circumferential surface 88.

The ring means between the first and second screw stages 52, 54 has a resistance to flow which adjusts itself according to the characteristics of the melted material leaving the first stage. More particularly, if the material leaving the first stage is well melted, the material experiences a reduced flow resistance which allows material to pass through the first stage more quickly; conversely, if the material leaving the first stage is poorly melted, the material experiences an increased flow resistance due to partial blocking of the restricted flow area so that subsequent material passes through the first stage more slowly and, therefore, receives more heat and work.

The slotted blister ring 84 is preferred over a simple annular ring since the slotted blister ring 84 is less sensitive to screw rotational speed. For example, a simple annular ring generates high shear forces on material passing through its restricted annular space. On the other hand, the slotted blishter ring 84 has the channels 86 which are exposed to the barrel bore 24 for only a portion of their perimeter. Accordingly, there is less shear interaction between the bore 24 and the slotted blister ring 84. In addition, since the channels 86 are closely adjacent to the bore 24, the channels 86 are effective to wipe the bore surface and substantially diminish the tendency of material to adhere to the bore surface at the location of the ring means.

Returning now to FIG. 1, the screw 50 may extend from the first end 26 of the barrel 22 such that it is provided with a piston 90. The piston may be integral with the shaft of the screw 50 or it may be suitably connected thereto in any conventional manner. The piston 90 preferably includes an annular piston head 92 and is slidably received by a piston receiving bore 94 of a cylinder 95. The cylinder 95 is mounted on the machine base 30 to be longitudinally fixed with respect to the barrel 22. The piston head 92 cooperates with the cylinder 95 to define an injection chamber 96 and a return chamber 98.

An hydraulic conduit 99 communicates with the injection chamber 96 to supply pressurized hydraulic fluid from a pump 100 which communicates with an hydraulic fluid reservoir 102. The conduit 99 also communicates with a relief valve 104 which regulates the pressure of fluid in the injection chamber 96 and which allows fluid to pass from the injection chamber 96 to the reservoir 102.

The return chamber 98 communicates with another hydraulic conduit 106 which receives pressurized hydraulic fluid from a pump 108 that also communicates with the reservoir 102. The conduit 106 is also provided with a relief valve 110 to regulate the flow of fluid from the return chamber 98 to the reservoir 102 and to control pressure in the return chamber 98.

Connected to the end of the cylinder 95 is a suitable conventional drive motor 112. The drive motor is non-rotably connected to the cylinder and is operatively connected to a rotary drive member 114 that is rotably supported within the injection chamber 96 by a suitable conventional bearing 116. The rotary drive member 114 also includes a longitudinally extending portion 118 having a plurality of external parallel splines 120. The external splines 120 cooperate with corresponding internal splines 122 provided in an axially extending recess 124 of the piston 90.

The rotary drive member 114 and the annular recess 124 cooperate to define a cavity 126. An internal passage 128 is provided in the rotary drive member 114 to allow fluid communication between the injection chamber 96 and with the cavity 126 and to avoid an hydraulic lock in the chamber 126. In this manner, the piston 90 is rotatably driven by the motor 112 and is free to reciprocate longitudinally with respect to the cylinder 95.

Returning now to FIG. 3, the vent opening 46 may be provided with a vent liner 130 having a generally radially outwardly extending flange 132 and with a vertically upstanding substantially horizontal baffle or dam 134. The baffle 134 is recessed from the peripheral edge of the screw flight and defines an enlargement 136 of the barrel bore. The enlargement allows material to pass around the screw flight adjacent the dam 134 and, thus, diminishes the tendency of material to bleed into the vent opening.

A positioning pin 138 may be provided to position the vent liner 130 with respect to the barrel 22. The positioning pin 138 passes through the radially extending flange 132 and functions like a key to fix the rotational position of the vent liner 130. A retainer 140 is threadably secured to the barrel 22 and is operative to retain the vent liner 130 in position with respect to the barrel 22.

Connected to the retainer 140 is a suitable conventional vent stack 142 which, if desired, can be connected with a source of low pressure. The vent stack 142 may be secured to the barrel 22 by a plurality of bolts 144, as desired. At the end of the vent stack, a vent stack lid 146 may be provided (see FIG. 4). The lid 146 includes a port glass 148 to permit optical inspection of the dam 134 and the screw flight during operation of the injection molding machine. The lid 146 pivots about a first bolt 150 which is provided with a suitable conventional wing nut 152 and is secured by a second bolt 156 (and suitable conventional wing nut 158) received in a slot 154. In this manner, access for cleaning and detailed inspection are readily facilitated without requiring a complete disassembly of the vent stack.

In operation, synthetic resinous material in particulate form is supplied to the hopper 34 (see FIG. 1) of the injection molding machine. During a plasticating portion of the machine cycle, the material passes from the hopper 34 through the feed opening 32 into the first helical channel 62 and the feed section 64 of the first screw stage 52. As the screw 50 is rotated by the motor 112, the particulate material is advanced along the feed section 64 and enters the transition section 66. While passing through this transition section 66 and the downstream pumping section 68, the particulate synthetic resinous material is compressed, heated, masticated and plasticated to a substantially moldable consistency. At the same time, moisture and volatilizable substances are vaporized and form gaseous pockets in the plasticated material.

As the plasticated synthetic resinous material advances to the downstream end of the first stage 52, the blister ring restricts the flow of material and meters the flow of material into the second stage 54. The channels 86 of the slotted blister ring 84 are sized to regulate the flow of material by selecting a desired cross-sectional area and serve to create an hydraulic seal at the upstream end of the vent section 74. Plasticated material enters the low pressure zone of the vent section 74. Accordingly, the highly pressurized gaseous pockets of water vapor and volatile substances are released and escape through the vent opening 46, either to the atmosphere or to a subsequent processing apparatus. In addition, the first stage and the blister ring cooperate to increase the tolerance of the machine to a wide variety of synthetic resinous materials with different properties and characteristics.

As the plasticated material enters the second helical channel 72, it is advanced axially through the bore 24 by the rotary motion of the screw 50. As noted, the second screw flight has a larger pitch than the first screw flight 58. Accordingly, the second helical channel has a larger capacity for material and rapidly conveys material past the vent opening thereby reducing the potential for vent bleed. The first screw stage 52 and the blister ring cooperate to starve feed the second screw stage 54.

Also contributing to the reduced tendency for bleeding at the vent opening 46 is the enlargement 136 of the barrel bore 24 (FIG. 3). The enlargement and the baffle 134 allow material carried by the screw flight 70 to bypass the screw flight and to drain back into the channel without entering the vent stack.

The plasticated material then passes through the short transition section 76 (FIG. 1) and enters the short second pumping stage 78 which advances the material to the chamber 82. The second pumping stage 78 does generate suitable pressure in the plasticated material to pass through the valve 80; however, it does not develop a substantial pressure in the material. As the plasticated material accumulates in the chamber 82, the screw 50 is retracted (movement to the right in FIG. 1) to enlarge the volume of the chamber 82.

During powered movement of the screw 50 out of the barrel 22, the pressure maintained in the return chamber 98 may be close to, or perhaps exceed, the pressure in the injection chamber 96. A small pressure differential is established on opposite sides of the annular piston 92 by regulating the pressure in the injection chamber 96 and the return chamber 98 through adjustment of pumps 100, 108 and relief valves 104, 110.

After a sufficiently large volume, or charge, of material has accumulated in the chamber 82, the screw is rapidly advanced into the barrel 22 to inject the charge into the mold cavity 38. This advancement or injection stroke of the screw may be accomplished by opening the relief valve 110 and closing the relief valve 104 so that a high pressure, high volume flow of fluid passes through the pump 100 and into the injection chamber 96. The high pressure communicates with the cavity 126 through the channel 128 and therefore acts over the entire end surface of the piston 90. With a non-return valve 80, the tendency of material to bleed from the vent opening 46 as a result of back flow along the channel 72 is substantially reduced.

After the injection stroke, the machine 20 enters a holding portion of the cycle during which material in the mold cavity begins to solidify. During the hold portion, the plasticated material remaining in the vent region 74 communicates with the vent opening 46 for a period of time. Accordingly, gaseous pockets of volatile substances and water vapor in material in the vent section are free to be released and pass out through the vent opening 46. Rotary motion of the screw 50 may again commence to begin accumulation of another charge of plasticated material while the molded article is removed from the cavity.

It should now be apparent that an improved vented injection molding machine has been provided according to the present invention. Moreover, it will be apparent to those skilled in the art that numerous modifications, variations, substitutions and equivalents for the features of the present invention may be made. Accordingly, it is expressly intended that all such modifications, variations, substitutions and equivalents for the features of the invention which fall within the spirit and scope of the invention as defined in the appended claims be embraced thereby.

What is claimed is:

1. A vented injection molding machine operable to masticate, plasticate, and devolatilize synthetic resinous material while preparing the synthetic resinous material for injection into a mold cavity which shapes the material, said machine comprising:

base means;

barrel means cantilever mounted on the base means and having a longitudinal screw-receiving bore, a distal end, a feed opening communicating with the bore to admit synthetic resinous feed material, a discharge opening communicating with the bore at the distal end to deliver material to a mold, and a vent opening between the feed opening and the discharge opening to exhaust liberated gases;

a rotatable reciprocable screw positioned in the screw-receiving bore and including a first stage having a protruding screw flight with a first pitch, communicating with the feed opening, and operable with the barrel means to receive, masticate and substantially complete plastication of synthetic resinous material, protruding ring means downstream of the first stage, upstream of the vent opening, cooperating with the first stage to tolerate a variety of synthetic resinous materials, and operable to meter the flow of plasticated material from the first stage, and a second stage having a protruding screw flight with an axially short pumping section at the downstream end, communicating with the vent opening and the discharge opening, having a second pitch that exceeds the first pitch so that the first stage and the ring means starve feed the second stage to reduce the tendency of material to bleed from the vent opening operable with the barrel means to devolatilize plasticated synthetic resinous material upstream of the short pumping section and to advance the plasticated devolatilized material through the short pumping section without substantial pressurization; and operating means mounted on the base means, connected with the screw, operable to rotate the screw within the barrel means during plastication of the material, operable to retract the screw from the discharge opening during plastication, and operable to move the screw longitudinally toward the discharge opening while expelling accumulated material therethrough.

2. The machine of claim 1 wherein:

the protruding screw flight of the first stage cooperates with the barrel means to define a first helical channel having a root diameter and including a feed section communicating with the feed opening and having a small root diameter to define a deep channel to receive resinous material, a transition section downstream of the feed section, having a root diameter increasing in the downstream direction and operable to begin mastication of the synthetic resinous material, and a pumping section downstream of the transition section, having a large root diameter and operable to masticate and substantially complete plastication of the synthetic resinous material; and the protruding screw flight of the second stage cooperates with the barrel means to define a second helical channel having a root diameter and including a vent section communicating with the vent opening, having a root diameter smaller than the root diameter of the feed section and operable to receive plasticated material from the first stage and to allow exhaustion of gaseous volatiles and water vapor through the vent opening, and the axially short pumping section downstream of the vent section, having a large root diameter, operable to be filled by devolatilized synthetic resinous material so as to create an hydraulic seal in the channel downstream of the vent section and operable to advance the devolatilized synthetic resinous material to the end of the screw.

3. The machine of claim 2 wherein the short pumping stage has a length about three times the screw diameter.

4. The machine of claim 2 wherein:
the screw has a length approximately twenty-six times its diameter;
the feed section has a length about seven times the screw diameter;
the transition section has a length about four times the screw diameter;
the pumping section has a length about five and one-half times the screw diameter;
the vent section has a length about six times the screw diameter; and
the short pumping stage has a length about three times the screw diameter.

5. A vented injection molding machine operable to masticate, plasticate, and devolatilize synthetic resinous material while preparing the synthetic resinous material for injection into a mold cavity which shapes the material, said machine comprising:
base means;
barrel means cantilever mounted on the base means and having a longitudinal screw-receiving bore, a distal end, a feed opening communicating with the bore to admit synthetic resinous feed material, a discharge opening communicating with the bore at the distal end to deliver material to a mold, and a vent opening between the feed opening and the discharge opening to exhaust liberated gases;
a rotatable reciprocable screw positioned in the screw-receiving bore and including
a first stage having a protruding screw flight with a first pitch, communicating with the feed opening, and operable with the barrel means to receive, masticate and substantially complete plastication of synthetic resinous material,
protruding ring means downstream of the first stage, upstream of the vent opening,
cooperating with the first stage to tolerate a variety of synthetic resinous materials, and operable to meter the flow of plasticated material from the first stage, and
a second stage having a protruding screw flight with an axially short pumping section at the downstream end, communicating with the vent opening and the discharge opening, having a second pitch that exceeds the first pitch so that the first stage and the ring means starve feed the second stage to reduce the tendency of material to bleed from the vent opening operable with the barrel means to devolatilize plasticated synthetic resinous material upstream of the short pumping section and to advance the plasticated devolatilized material through the short pumping section without sustantial pressurization;
operating means mounted on the base means, connected with the screw, operable to rotate the screw within the barrel means during plastication of the material, operable to retract the screw from the discharge opening during plastication, and operable to move the screw longitudinally toward the discharge opening while expelling accumulated material therethrough; and wherein the vent is generally horizontal to permit visual inspection of the screw and includes a baffle which partially blocks the lower portion of the vent opening to inhibit bleed flow therethrough while allowing liberated gases to exhaust through the unblocked upper portion.

6. The machine of claim 5 wherein the vent opening includes an insert comprising:
an annular section having an exhaust bore and an inner end blended to conform with the screw receiving bore;
a radially outwardly extending flange at the other end of the annular section operable to control the depth to which the annular section extends into the vent opening; and
the baffle substantially closing the exhaust bore, having an upper edge substantially parallel with the screw-receiving bore axis and spaced from the screw-receiving bore surface and a curved face connecting the upper edge with the inner end.

7. A vented injection molding machine operable to masticate, plasticate, and devolatilize synthetic resinous material while preparing the synthetic resinous material for injection into a mold cavity which shapes the material, said machine comprising:
base means;
barrel means cantilever mounted on the base means and having a longitudinal screw-receiving bore, a distal end, a feed opening communicating with the bore to admit synthetic resinous feed material, a discharge opening communicating with the bore at the distal end to deliver material to a mold, and a vent opening between the feed opening and the discharge opening to exhaust liberated gases;
a rotatable reciprocable screw positioned in the screw-receiving bore and including
a first stage having a protruding screw flight with a first pitch, communicating with the feed opening, and operable with the barrel means to receive, masticate and substantially complete plastication of synthetic resinous material,
protruding ring means downstream of the first stage, upstream of the vent opening,
cooperating with the first stage to tolerate a variety of synthetic resinous materials, and operable to meter the flow of plasticated material from the first stage, and
a second stage having a protruding screw flight with an axially short pumping section at the downstream end, communicating with the vent opening and the discharge opening, having a second pitch that exceeds the first pitch so that the first stage and the ring means starve feed the second stage to reduce the tendency of material to bleed from the vent opening operable with the barrel means to devolatilize plasticated synthetic resinous material upstream of the short pumping section and to advance the plasticated devolatilized material through the short pumping section without substantial pressurization;
operating means mounted on the base means, connected with the screw, operable to rotate the screw withing the barrel means during plastication of the material, operable to retract the screw from the discharge opening during plastication, and operable to move the screw longitudinally toward the discharge opening while expelling accumulated material therethrough; and wherein the ring means comprises an integral protrusion of the screw having a peripheral surface with working radial clearance in the screw-receiving bore and a plurality of spaced-apart axially extending slots in the peripheral surface through which plasticated material may pass.

8. A vented injection molding machine for masticating, plasticating and devolatilizing synthetic resinous material and operable to inject plasticated material into a mold, comprising:

a base for supporting the machine;

a barrel cantilevered from the base and having a longitudinal bore with a feed opening through which synthetic resinous material enters the bore, a discharge opening through which plasticated material leaves the bore, and a vent opening through which liberated volatiles are exhausted from the bore;

a rotatable reciprocable screw positioned in the longitudinal bore, having
  an end protruding therefrom,
  a first stage screw flight with a first pitch, being in communication with the feed opening and cooperating with the longitudinal bore to masticate, plasticate and pressurize the synthetic resinous material,
  ring means between the vent opening and the feed opening operable to control material flow rate through the first stage screw flight, and
  a second stage screw flight with a second pitch greater than the first pitch, being spaced from the first stage screw flight by the ring means, being starve fed by the first stage screw flight and the ring means to increase the tolerance of synthetic resinous material, being in communication with the vent opening, having a vent portion partially filled by material from the first stage so that volatiles evolve into a space communicating with the vent opening and having a short pumping section with a length less than that of the vent section, operable to prevent communication between the downstream end of the screw and the vent section and to advance plasticated devolatilized material to the end of the screw; and means connected to the protruding end of the screw, supported by the base and operable to rotate and reciprocate the screw in the barrel to prepare and inject a quantity of plasticated synthetic resinous material and operable to retract the screw from the barrel as a quantity of material accumulates.

9. A vented injection molding machine for masticating, plasticating and devolatilizing synthetic resinous material and operable to inject plasticated material into a mold, comprising:

a base for supporting the machine;

a barrel cantilevered from the base and having a longitudinal bore with a feed opening through which synthetic resinous material enters the bore, a discharge opening through which plasticated material leaves the bore, and a vent opening through which liberated volatiles are exhausted from the bore;

a rotatable reciprocable screw positioned in the longitudinal bore, having
  an end protruding therefrom,
  a first stage screw flight with a first pitch, being in communication with the feed opening and cooperating with the longitudinal bore to masticate, plasticate and pressurize the synthetic resinous material,
  ring means between the vent opening and the feed opening operable to control material flow rate through the first stage screw flight, and
  a second stage screw flight with a second pitch greater than the first pitch, being starve fed by the first stage screw flight and the ring means to increase the tolerance of synthetic resinous material, being in communication with the vent opening, having a vent portion partially filled by material from the first stage so that volatiles evolve into a space communicating with the vent opening and having a short pumping section with a length less than that of the vent section, operable to prevent communication between the downstream end of the screw and the vent section and to advance plasticated devolatilized material to the end of the screw;

means connected to the protruding end of the screw, supported by the base and operable to rotate and reciprocate the screw in the barrel to prepare and inject a quantity of plasticated synthetic resinous material and operable to retract the screw from the barrel as a quantity of material accumulates; and wherein the ring means comprises an integral protrusion having a peripheral surface with axially extending slots which regulate flow from the first screw flight section.

* * * * *